United States Patent
Ohara et al.

(10) Patent No.: US 12,476,047 B2
(45) Date of Patent: *Nov. 18, 2025

(54) CONDUCTIVE PASTE

(71) Applicant: Murata Manufacturing Co., Ltd., Nagaokakyo (JP)

(72) Inventors: Takashi Ohara, Nagaokakyo (JP); Hideyasu Onishi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,022

(22) Filed: Mar. 19, 2024

(65) Prior Publication Data
US 2024/0222017 A1     Jul. 4, 2024

Related U.S. Application Data

(63) Continuation of application No. PCT/JP2023/017693, filed on May 11, 2023.

(30) Foreign Application Priority Data

Jun. 26, 2022   (JP) ................................. 2022-102287

(51) Int. Cl.
*H01B 1/22* (2006.01)
*C04B 35/462* (2006.01)
(Continued)

(52) U.S. Cl.
CPC ......... *H01G 4/0085* (2013.01); *C04B 35/462* (2013.01); *C04B 35/465* (2013.01);
(Continued)

(58) Field of Classification Search
CPC ... H01B 1/00; H01B 1/22; C09D 5/24; H01G 4/008; H01G 4/30; H01G 4/33
See application file for complete search history.

(56) References Cited

U.S. PATENT DOCUMENTS 3,838,071 A      9/1974   Amin
6,829,137 B2 *  12/2004   Konaka .................. B82Y 30/00
                                                    361/321.5
(Continued)

FOREIGN PATENT DOCUMENTS

JP      S4956822 A     6/1974
JP      2001284162 A   10/2001
(Continued)

OTHER PUBLICATIONS

English language machine translation of JP 2000-232032 (pub Aug. 2000).*
(Continued)

*Primary Examiner* — Mark Kopec

(57) ABSTRACT

A conductive paste included in inner electrodes of a multilayer ceramic capacitor is fired and includes a conductive metal powder, a ceramic powder, an organic solvent, and an organic binder. The conductive metal powder includes copper, and at least a portion of the ceramic powder is a powder of at least one oxide of an $ABO_3$ type with a specified ionic radius in which a ratio of a six-coordinate ionic radius of an A-site element in $ABO_3$ to a six-coordinate ionic radius of copper is about 0.96 or greater and about 1.04 or less.

3 Claims, 1 Drawing Sheet

(51) Int. Cl.
    *C04B 35/465*     (2006.01)
    *C04B 35/468*     (2006.01)
    *C04B 35/49*     (2006.01)
    *C04B 35/636*     (2006.01)
    *H01G 4/008*     (2006.01)
    *H01G 4/12*     (2006.01)
    *H01G 4/30*     (2006.01)

(52) U.S. Cl.
    CPC .......... *C04B 35/4682* (2013.01); *C04B 35/49* (2013.01); *C04B 35/6365* (2013.01); *H01B 1/22* (2013.01); *C04B 2235/3236* (2013.01); *C04B 2235/3249* (2013.01); *C04B 2235/766* (2013.01); *C04B 2235/768* (2013.01); *H01G 4/1227* (2013.01); *H01G 4/1236* (2013.01); *H01G 4/30* (2013.01)

(56) References Cited

U.S. PATENT DOCUMENTS

| | | | | |
|---|---|---|---|---|
| 7,358,208 | B2* | 4/2008 | Ito | H01G 4/1227 |
| | | | | 501/138 |
| 7,544,314 | B2* | 6/2009 | Tanaka | C03C 8/14 |
| | | | | 252/514 |
| 2013/0258551 | A1 | 10/2013 | Kim et al. | |
| 2018/0068790 | A1 | 3/2018 | Chigira | |
| 2019/0131071 | A1 | 5/2019 | Fujimoto | |

FOREIGN PATENT DOCUMENTS

| | | |
|---|---|---|
| JP | 2013214698 A | 10/2013 |
| JP | 2015083714 A | 4/2015 |
| JP | 2016031807 A | 3/2016 |
| JP | 2016079345 A | 5/2016 |
| JP | 2018041814 A | 3/2018 |

OTHER PUBLICATIONS

English language translation of form PCT/ISA/237 (mailed Aug. 2022).*
Kishi et al "Base-Metal Electrode-Multilayer Ceramic Capacitors: Past, Present and Future Perspectives", Jpn. J. Appl. Phys. vol. 42 (2003) pp. 1-15 Part 1, No. 1, Jan. 2003.*
International Search Report in PCT/JP2023/017693, mailed Aug. 1, 2023, 3 pages.
Written Opinion in PCT/JP2023/017693, mailed Aug. 1, 2023, 3 pages.
Ohara et al., "Conductive Paste", U.S. Appl. No. 18/598,301, filed Mar. 7, 2024.
Ohara et al., "Multilayer Ceramic Capacitor", U.S. Appl. No. 18/608,994, filed Mar. 19, 2024.

* cited by examiner

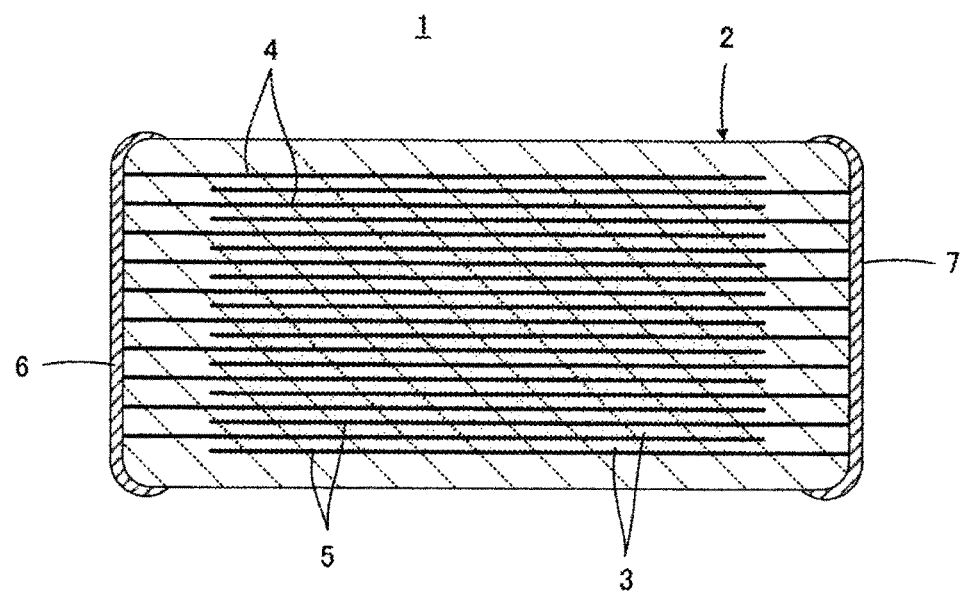

CONDUCTIVE PASTE

CROSS REFERENCE TO RELATED APPLICATIONS

This application claims the benefit of priority to Japanese Patent Application No. 2022-102287 filed on Jun. 26, 2022 and is a Continuation Application of PCT Application No. PCT/JP2023/017693 filed on May 11, 2023. The entire contents of each application are hereby incorporated herein by reference.

BACKGROUND OF THE INVENTION

1. Field of the Invention

The present invention relates to a conductive paste to be included in inner electrodes of a multilayer ceramic capacitor.

2. Description of the Related Art

A multilayer ceramic capacitor typically includes a multilayer body including multiple dielectric layers made of ceramic and stacked together and multiple inner electrodes arranged along multiple interfaces between the dielectric layers, with each inner electrode extending along a respective interface, and multiple outer electrodes provided at the outer surface of the multilayer body and electrically coupled to the inner electrodes. The inner electrodes include multiple first inner electrodes and multiple second inner electrodes arranged alternately in the direction of stacking in the multilayer body, and the outer electrodes include a first outer electrode electrically coupled to the first inner electrodes and a second outer electrode electrically coupled to the second inner electrodes.

In an attempt to reduce the size and increase the capacitance of a multilayer ceramic capacitor in such a structure simultaneously, it is required to form the dielectric layers and inner electrodes as thin layers while increasing the coverage of the inner electrodes (electrode continuity). In general, in a firing step during the manufacture of a multilayer ceramic capacitor, the sintering temperature of conductive metal particles included in conductive paste films that are to be the inner electrodes is lower than the sintering temperature of the ceramic that forms the dielectric layers, which means that the metal particles included in the inner electrodes are sintered first. This causes a reduced coverage of the inner electrodes. In particular, inner electrodes formed as thin layers, for example reduced to a thickness of 1 μm or less, are apt to have a low coverage. With such inner electrodes, there is a disadvantage that such a low coverage often hinders increasing the capacitance.

To form thin-layer inner electrodes with a high coverage, therefore, it is necessary to increase the temperature at which the conductive metal particles included in the conductive paste films that are to be the inner electrodes sinter in the firing step during the manufacture of the multilayer ceramic capacitor. This helps bring the temperature at which the metal particles included in the conductive paste films that are to be the inner electrodes sinter closer to the temperature at which the ceramic that forms the dielectric layers starts sintering, thereby helping make the onset of shrinkage during sintering closer between the inner electrodes and the dielectric layers. As a result, the coverage of the inner electrodes increases, helping achieve a large capacitance.

As a way to increase the coverage of the inner electrodes and achieve a large capacitance by the method described above, it is known to add a ceramic material including a composition similar to the composition of the ceramic that forms the dielectric layers, or, in other words, a common material, to the conductive paste for the formation of the inner electrodes, for example as described in paragraph of Japanese Unexamined Patent Application Publication No. 2016-31807. By adding a common material, it is possible to shift the onset of sintering of the metal particles included in the conductive paste films that are to be the inner electrodes toward higher temperatures and thereby to bring the temperature at which the metal particles included in the conductive paste films sinter closer to the temperature at which the ceramic that forms the dielectric layers sinters.

SUMMARY OF THE INVENTION

It is, however, undeniable that even after the addition of a common material to the conductive paste for the formation of inner electrodes, the temperature at which the metal particles included in the conductive paste sinter remains lower than the temperature at which the ceramic that forms the dielectric layers sinters. Thus, there is a need for further improvement. In particular, for inner electrodes formed as thin layers, for example, reduced to a thickness of 1 μm or less, there is a compelling necessity for an effective solution for the problem of reduced coverage, which hinders increasing the capacitance.

Example embodiments of the present invention provide conductive pastes to be included in inner electrodes to enable the inner electrodes to maintain a relatively high coverage even when formed as thin layers.

A conductive paste according to an example embodiment of the present invention includes a conductive metal powder, a ceramic powder, an organic solvent, and an organic binder. The conductive metal powder includes copper, and at least a portion of the ceramic powder is a powder of at least one oxide of an $ABO_3$ type with a specified ionic radius in which a ratio of a six-coordinate ionic radius of an A-site element in $ABO_3$ to a six-coordinate ionic radius of copper is about 0.96 or greater and about 1.04 or less.

Forming the inner electrodes of a multilayer ceramic capacitor using a conductive paste according to an example embodiment of the present invention increases the coverage of the inner electrodes. Even when the inner electrodes are formed as thin layers, a high coverage of the inner electrodes is maintained, thus ensuring increased capacitance of the multilayer ceramic capacitors.

The above and other elements, features, steps, characteristics and advantages of the present invention will become more apparent from the following detailed description of the example embodiments with reference to the attached drawings.

BRIEF DESCRIPTION OF THE DRAWINGS

The Drawing is a cross-sectional view schematically illustrating a multilayer ceramic capacitor 1 to which a conductive paste according to this invention is applied.

DETAILED DESCRIPTION OF THE EXAMPLE EMBODIMENTS

With reference to the Drawing, the structure of a multilayer ceramic capacitor 1 according to an example embodiment of the present invention will be described.

The multilayer ceramic capacitor 1 includes a multilayer body 2. The multilayer body 2 includes multiple dielectric layers 3 made of ceramic and stacked together and multiple inner electrodes 4 and 5 arranged along the interfaces between the multiple dielectric layers 3. The inner electrodes 4 and 5 are categorized into multiple first inner electrodes 4 and multiple second inner electrodes 5 arranged alternately in the direction of stacking in the multilayer body 3. At the outer surface of the multilayer body 2, or more specifically the end surfaces facing each other, a first outer electrode 6 and a second outer electrode 7 are provided, with each outer electrode at a respective end surface. The first outer electrode 6 is electrically coupled to the first inner electrodes 4, and the second outer electrode 7 is electrically coupled to the second inner electrodes 5.

The dielectric layers 3 are made of a ceramic that includes, for example, $ABO_3$ (A is at least one of Ba, Ca, or Sr, and B is at least one of Ti or Zr) as a base material. The ceramic may include the $ABO_3$ as a base material and further include at least one of Mn, Mg, Si, Y, Dy, or Gd as a minor additional material. The inner electrodes 4 and 5 include copper as a conductive material. As a characteristic composition, furthermore, the inner electrodes 4 and 5 include, for example, at least one of $CuTiO_3$, $CoTiO_3$, or $CrTiO_3$. $CuTiO_3$, $CoTiO_3$, and $CrTiO_3$ have an ilmenite crystal structure.

As can be seen from the experimental examples described later herein, in an example embodiment, the dielectric layers 3 are made of a ceramic that includes at least one of $BaTio_3$, $SrTiO_3$, or $CaZro_3$ as a base material, and the inner electrodes 4 and 5 include copper as a conductive material, include at least one of $CuTiO_3$, $CoTiO_3$, or $CrTiO_3$ as a ceramic material, and, optionally, further include the at least one of $BaTiO_3$, $SrTiO_3$, or $CaZro_3$ included in the dielectric layers 3.

The outer electrodes 6 and 7 are formed by, for example, applying a conductive paste in which Ag or Cu is the base ingredient in the conductive material to the end surfaces of the multilayer body 2 and baking the applied paste. Optionally, the thick films formed through baking may be coated with, for example, Ni plating and Sn plating on it.

The multilayer ceramic capacitor 1 is manufactured through, for example, steps such as the following. First, a ceramic slurry including raw material powders for ceramic that will provide a composition as described above is produced. Then ceramic green sheets are shaped by applying an appropriate sheet shaping method to the ceramic slurry. Then a conductive paste that is to be each of the inner electrodes 4 and 5 is applied onto predetermined ones of the multiple ceramic green sheets, for example by printing. Then the multiple ceramic green sheets are stacked together and then pressure-bonded to provide a raw multilayer body. Then the raw multilayer body is fired. In this step of firing, the ceramic green sheets turn into the dielectric layers 3. Thereafter, the outer electrodes 6 and 7 are formed at the end surfaces of the multilayer body 3.

The conductive paste that is to be the inner electrodes 4 and 5 used during the above-described manufacture of the multilayer ceramic capacitor 1 is preferably produced as follows.

In the production of the conductive paste, a first step, in which a ceramic powder slurry including at least one ceramic powder, an organic solvent, and a dispersant is prepared, a second step, in which a metal powder slurry including a conductive metal powder, an organic solvent, and a dispersant is prepared, a third step, in which an organic vehicle including an organic resin component and an organic solvent is prepared, and a fourth step, in which the ceramic powder slurry, metal powder slurry, and organic vehicle are mixed together, are carried out.

To be more specific, in the first step, a ceramic powder slurry is prepared by mixing at least one ceramic powder and a dispersant into an organic solvent.

The ceramic powder is, for example, a powder of at least one of $CuTiO_3$, $CoTiO_3$, or $CrTiO_3$ as $ABO_3$ oxides. In addition, a powder of at least one of $BaTiO_3$, $SrTiO_3$, or $CaZro_3$ as common materials is used in some cases.

Since the conductive metal powder included in the metal powder slurry prepared in the second step, which will be described later herein, includes copper, the aforementioned $CuTiO_3$, $CoTiO_3$, or $CrTiO_3$ as $ABO_3$ oxides are oxides of an $ABO_3$ type with a specified ionic radius in which the ratio of the six-coordinate ionic radius of the A-site element in $ABO_3$ to the six-coordinate ionic radius of copper is about 0.96 or greater and about 1.04 or less.

With a ceramic powder formed from at least one of $CuTiO_3$, $CoTiO_3$, or $CrTiO_3$ as $ABO_3$ oxides, the reaction that can occur between it and the copper powder included in the metal powder slurry prepared in the second step can be moderated. The ceramic powder may include the $ABO_3$ oxide as a base material and further include at least one of Mn, Mg, Si, Y, Dy, or Gd as a minor additional material. When the ceramic powder includes such a minor additional material, the sintering of the metal particles is more effectively inhibited in some cases, as a result of further controlled growth of ceramic particles.

The dispersant mixed into the ceramic powder in the first step can be, for example, an anionic polymer dispersant. The organic solvent can be, for example, dihydroterpineol.

In the second step, a metal powder slurry is prepared by mixing a conductive metal powder and a dispersant into an organic solvent. The conductive metal powder is, for example, a powder of copper or its alloy. A dispersant and an organic solvent that can be used in the second step are the same as in the first step.

In the third step, an organic vehicle is prepared by mixing an organic resin component into an organic solvent. The organic resin component can be, for example, ethyl cellulose resin. An organic solvent that can be used in the third step, too, is the same as in the first step.

In the fourth step, the ceramic powder slurry, metal powder slurry, and organic vehicle described above are mixed together. Through this, a conductive paste that is to be the inner electrodes 4 and 5 is obtained. This conductive paste includes a ceramic powder slurry, and, as stated earlier herein, the ceramic powder slurry includes a ceramic powder formed from at least one of $CuTiO_3$, $CoTiO_3$, or $CrTiO_3$ as $ABO_3$ oxides with a specified ionic radius. The inner electrodes 4 and 5 included in the multilayer ceramic capacitor 1 manufactured through a firing step, therefore, will include at least one of $CuTiO_3$, $CoTiO_3$, or $CrTiO_3$.

EXPERIMENTAL EXAMPLES

Experimental examples conducted to verify advantages provided by example embodiments of the present invention will now be described.

In these experimental examples, a copper powder was prepared as the conductive metal powder included in the conductive paste for the formation of inner electrodes.

Separately, as $ABO_3$ oxides with a specified ionic radius to serve as components of the ceramic powder included in the conductive paste for the formation of inner electrodes, $BaTiO_3$, $CaZrO_3$, and $SrTiO_3$ were prepared in addition to $CuTiO_3$, $CoTiO_3$, and $CrTiO_3$. In Table 1, the "crystal structure," "coordination number," "A-site element," and "ionic radius" are presented for these $ABO_3$ oxides. It should be noted that Ba, Ca, and Sr are twelve-coordinate when they are in their native perovskite structure, but become six-coordinate when they dissolve in the sites of the six-coordinate element (Cu, Co, or Cr) in the ilmenite structure. Consequently, for Ba, Ca, and Sr, too, the "ionic radius" in Table 1 represents a six-coordinate value.

TABLE 1

| $ABO_3$ oxide | Crystal structure | Coordination number | A-site element | Ionic radius [Å] |
|---|---|---|---|---|
| $CuTiO_3$ | Ilmenite | 6 | Cu | 0.77 |
| $CoTiO_3$ | Ilmenite | 6 | Co | 0.74 |
| $CrTiO_3$ | Ilmenite | 6 | Cr | 0.80 |
| $BaTiO_3$ | Perovskite | 12 | Ba | 1.35 |
| $CaZrO_3$ | Perovskite | 12 | Ca | 1.00 |
| $SrTiO_3$ | Perovskite | 12 | Sr | 1.18 |

Experimental Examples 1, 2, and 3, which were conducted with different ceramic raw materials forming the dielectric layers, will now be described.

Experimental Example 1

Base Material of the Ceramic Forming the Dielectric Layers: $BaTiO_3$

1. Preparation of a $BaTiO_3$ Ceramic Raw Material that Will Form the Dielectric Layers As starting materials, powders of $BaCO_3$ and $TiO_2$, which were base ingredients, were weighed out and mixed together for 72 hours in a ball mill. Then the resulting mixture was subjected to heat treatment for 2 hours with the maximum temperature being 1000° C., yielding a thermally treated powder. Separately, as minor ingredients, powders of MnO, $Dy_2O_3$, MgO, $SiO_2$, and $BaCO_3$ were prepared and weighed out in such a manner that the proportions of the minor ingredient powders to the thermally treated powder would be as in $100BaTiO_3+0.5Mn+1.0Dy+1.0Mg+1.0Si+2.0Ba$. These minor ingredient powders were added to the thermally treated powder, the powders were mixed together for 24 hours in a ball mill, and then the resulting mixture was dried. In this manner, a $BaTiO_3$ ceramic raw material powder was obtained.

2. Preparation of a Conductive Paste for the Formation of Inner Electrodes

A powder of the "$ABO_3$ oxide" specified in Table 2, which will be provided later herein, and the $BaTiO_3$ ceramic raw material powder for dielectric layers described above were used as ceramic powders included in the conductive paste for the formation of inner electrodes.

The powder of an "$ABO_3$ oxide" and $BaTiO_3$ ceramic raw material powder were weighed out to the "percentages added" specified in Table 2. These powders and dihydroterpineol as the organic solvent and an anionic polymer dispersant as the dispersant were subjected to preliminary mixing in a stirring mill without a medium, and then dispersion treatment was performed in a medium stirring mill. In this manner, a ceramic powder slurry was prepared (first step).

Separately, a metal powder slurry was prepared by subjecting a copper powder as the conductive metal powder, dihydroterpineol as the organic solvent, and an anionic polymer dispersant as the dispersant to dispersion treatment in a three-roll mill (second step).

An organic vehicle, furthermore, was obtained by mixing ethyl cellulose resin as the organic resin component with dihydroterpineol, which is an organic solvent (third step).

Thereafter, the metal powder slurry and ceramic powder slurry described above were added to the organic vehicle described above, and mixing and dispersion treatment was performed. In this manner, a conductive paste for the formation of inner electrodes was prepared (fourth step).

In Table 2, the ratio of the six-coordinate ionic radius of the A-site element to the six-coordinate ionic radius of copper, which was to be included in the inner electrodes, or the "ionic radius ratio (A-site element/metallic copper)," is presented. It should be noted that for sample 7, the ratio of the six-coordinate ionic radius of the Ba element (1.35 Å), indicated in Table 1, to the six-coordinate ionic radius of copper (0.77 Å) is presented.

3. Production of a Multilayer Ceramic Capacitor

A ceramic slurry including the $BaTiO_3$ ceramic raw material powder prepared in 1 above was prepared, and then ceramic green sheets were shaped by applying doctor blading to the ceramic slurry. Then the conductive paste for the formation of inner electrodes prepared in 2 above was applied onto predetermined ones of the multiple ceramic green sheets by screen printing. Then the multiple ceramic green sheets were stacked together and then pressure-bonded to provide a raw multilayer body. Then the raw multilayer body was fired. Thereafter, outer electrodes were formed at the end surfaces of the sintered multilayer body. In this manner, a sample multilayer ceramic capacitor was produced.

4. Evaluation

TABLE 2

| Sample | $ABO_3$ oxide | Percentage added [% by volume] $ABO_3$ oxide | Percentage added [% by volume] $BaTiO_3$ | Ionic radius ratio (A-site element/metallic copper) | Coverage [%] | Assessment |
|---|---|---|---|---|---|---|
| 1 | $CuTiO_3$ | 100 | 0 | 1.00 | 85 | ○ |
| 2 | $CoTiO_3$ | 100 | 0 | 0.96 | 85 | ○ |
| 3 | $CrTiO_3$ | 100 | 0 | 1.04 | 84 | ○ |
| 4 | $CuTiO_3$ | 10 | 90 | 1.00 | 85 | ○ |
| 5 | $CoTiO_3$ | 10 | 90 | 0.96 | 85 | ○ |
| 6 | $CrTiO_3$ | 10 | 90 | 1.04 | 84 | ○ |
| 7 | — | — | 100 | 1.75 | 74 | x |

An inner electrode and a dielectric layer located in the middle, in the height direction, of the multilayer body included in the sample multilayer ceramic capacitor were torn apart from each other by electric field separation.

Then the vicinity of the center (for example, the position at about ½ in the width direction and about ½ in the length direction) of the exposed inner electrode was observed using a microscope at a magnification of 100 times. By analyzing the obtained image, the percentage of the area that the conductive film as an inner electrode occupied in the exposed portion was determined as the "coverage" presented in Table 2. Samples with a "coverage" of 80% or more were determined to be good; "o" was entered in the "Assessment" section. Samples with a "coverage" of lower than 80% were determined to be poor; "x" was entered in the "Assessment" section.

5. Discussion

Samples 1 to 6 in Table 2 received an "assessment" of "0." For these samples 1 to 6, the inner electrodes include any of $CuTiO_3$, $CoTiO_3$, or $CrTiO_3$ as an $ABO_3$ oxide. The inner electrodes, furthermore, include copper as a conductive material.

Ionic radii are focused on here. First, as indicated in the "$CuTiO_3$" section in Table 1, the six-coordinate ionic radius of copper is 0.77 Å. Meanwhile, the six-coordinate ionic radii of the A-site elements in $CuTiO_3$, $CoTiO_3$, and $CrTiO_3$ as the $ABO_3$ oxides included in the inner electrodes of samples 1 to 6 are 0.77 Å, 0.74 Å, and 0.80 Å, respectively, as presented in Table 1.

For samples 1 to 6, which were rated "o," the ratio of the six-coordinate ionic radius of the A-site element in $ABO_3$ to the six-coordinate ionic radius of copper, or the "ionic radius ratio," is about 0.96 or greater and about 1.04 or less.

Overall, for $CuTiO_3$, $CoTiO_3$, and $CrTiO_3$ as the $ABO_3$ oxides in samples 1 to 6, the six-coordinate ionic radius of the A-site element in $ABO_3$ is equal to or close to the six-coordinate ionic radius of copper as the conductive metal that is to be included in the inner electrodes. The energy difference between the oxide and copper in the inner electrodes, therefore, is 0 or small, allowing the oxide to remain in the inner electrode portion rather than being expelled. The oxide acts to improve the heat resistance of the inner electrodes. Presumably as a result of this, samples 1 to 6 achieved a high coverage of 84% or more.

As can be seen from samples 4 to 6, furthermore, the percentage of $CuTiO_3$, $CoTiO_3$, or $CrTiO_3$ added is not necessarily 100%. As long as the percentage was about 10% or more, the advantage of improved coverage was observed compared with when none of $CuTiO_3$, $CoTiO_3$, or $CrTiO_3$ was included. In addition, it is noted that in Experimental Example 1, the coverages of samples 4 to 6, in which the percentage of $CuTiO_3$, $CoTiO_3$, or $CrTiO_3$ added is 10%, exhibit values equal to the coverages of samples 1 to 3, in which the percentage added is 100%.

In contrast to these, for sample 7, which was rated "x," only $BaTiO_3$ as a common material has been added to the inner electrodes. In this case, Ba that is the A-site element in $ABO_3$ in the perovskite structure is twelve-coordinate, but when it dissolves in the A-site in the ilmenite structure, the comparison needs to be based on its six-coordinate ionic radius, the six being the coordination number of the A-site in the ilmenite structure. The six-coordinate ionic radius of Ba is, as presented in Table 1, 1.35 Å. Accordingly, the ratio of the six-coordinate ionic radius of Ba to the six-coordinate ionic radius of copper, or the "ionic radius ratio," is 1.75. As a result, the "ionic radius ratio" fell outside the range of about 0.96 to about 1.04, resulting in a low coverage of 74%.

For sample 7, the "ionic radius ratio" fell outside the range of about 0.96 to about 1.04, resulting in the expulsion of $BaTiO_3$ from the inner electrode portion. Presumably as a result of this, the heat resistance of the inner electrodes was not improved, and the coverage was low.

Experimental Example 2

Base Material of the Ceramic Forming the Dielectric Layers: $CaZrO_3$

1. Preparation of a $CaZrO_3$ Ceramic Raw Material that Will Form the Dielectric Layers As starting materials, powders of $CaCO_3$ and $ZrO_2$, which were base ingredients, and powders of MnO, $SiO_3$, and MgO, which were minor ingredients, were weighed out and mixed together for 72 hours in a ball mill. Then the resulting mixture was subjected to heat treatment for 2 hours, with the maximum temperature being 1000° C. In this manner, a $CaZrO_3$ ceramic raw material powder was obtained.

2. Preparation of a Conductive Paste for the Formation of Inner Electrodes

A powder of the "$ABO_3$ oxide" specified in Table 3, which will be provided later herein, and the $CaZrO_3$ ceramic raw material powder for dielectric layers described above were used as ceramic powders included in the conductive paste for the formation of inner electrodes.

The powder of an "$ABO_3$ oxide" and $CaZrO_3$ ceramic raw material powder were weighed out to the "percentages added" specified in Table 3, and a conductive paste for the formation of inner electrodes was prepared through the same steps as in the case of Experimental Example 1 above.

In Table 3, radius the "ionic ratio (A-site element/metallic copper)" is presented as in the case of Table 2. It should be noted that for sample 17, the ratio of the six-coordinate ionic radius of the Ca element (1.00 Å), indicated in Table 1, to the six-coordinate ionic radius of copper (0.77 Å) is presented.

3. Production of a Multilayer Ceramic Capacitor

A ceramic slurry including the $CaZrO_3$ ceramic raw material powder prepared in 1 above was prepared, and then ceramic green sheets were shaped by applying doctor blading to the ceramic slurry. After that, the same steps as in the case of Experimental Example 1 were followed to produce a sample multilayer ceramic capacitor.

4. Evaluation

TABLE 3

| Sample | $ABO_3$ oxide | Percentage added [% by volume] | | Ionic radius ratio (A-site element/metallic copper) | Coverage [%] | Assessment |
| --- | --- | --- | --- | --- | --- | --- |
| | | $ABO_3$ oxide | $CaZrO_3$ | | | |
| 11 | $CuTiO_3$ | 100 | 0 | 1.00 | 84 | o |
| 12 | $CoTiO_3$ | 100 | 0 | 0.96 | 84 | o |
| 13 | $CrTiO_3$ | 100 | 0 | 1.04 | 83 | o |
| 14 | $CuTiO_3$ | 10 | 90 | 1.00 | 83 | o |
| 15 | $CoTiO_3$ | 10 | 90 | 0.96 | 82 | o |
| 16 | $CrTiO_3$ | 10 | 90 | 1.04 | 81 | o |
| 17 | — | 0 | 100 | 1.30 | 72 | x |

The "coverage" was determined as presented in Table 3 following the same procedure as in the case of Experimental Example 1 and evaluated as in Experimental Example 1.

5. Discussion

Samples 11 to 16 in Table 3 received an "assessment" of "0." For these samples 11 to 16, the inner electrodes include any of $CuTiO_3$, $CoTiO_3$, or $CrTiO_3$ as an $ABO_3$ oxide. The inner electrodes, furthermore, include copper as a conductive material.

Ionic radii are focused on here. First, as indicated in the "$CuTiO_3$" section in Table 1, the six-coordinate ionic radius of copper is 0.77 Å. Meanwhile, the six-coordinate ionic radii of the A-site elements in $CuTiO_3$, $CoTiO_3$, and $CrTiO_3$ as the $ABO_3$ oxides included in the inner electrodes of samples 11 to 16 are 0.77 Å, 0.74 Å, and 0.80 Å, respectively, as presented in Table 1.

For samples 11 to 16, which were rated "o," the ratio of the six-coordinate ionic radius of the A-site element in $ABO_3$ to the six-coordinate ionic radius of copper, or the "ionic radius ratio," is about 0.96 or greater and about 1.04 or less.

Overall, for $CuTiO_3$, $CoTiO_3$, and $CrTiO_3$ as the $ABO_3$ oxides in samples 11 to 16, the six-coordinate ionic radius of the A-site element in $ABO_3$ is equal to or close to the six-coordinate ionic radius of copper as the conductive metal that is to be included in the inner electrodes. The energy difference between the oxide and copper in the inner electrodes, therefore, is 0 or small, allowing the oxide to remain in the inner electrode portion rather than being expelled. The oxide acts to improve the heat resistance of the inner electrodes. Presumably as a result of this, samples 11 to 16 achieved a high coverage of 81% or more.

As can be seen from samples 14 to 16, furthermore, the percentage of $CuTiO_3$, $CoTiO_3$, or $CrTiO_3$ added is not necessarily 100%. As long as the percentage was about 10% or more, the advantage of improved coverage was observed compared with when none of $CuTiO_3$, $CoTiO_3$, or $CrTiO_3$ was included.

In contrast to these, for sample 17, which was rated "x," only $CaZrO_3$ as a common material has been added to the inner electrodes. In this case, Ca that is the A-site element in $ABO_3$ in the perovskite structure is twelve-coordinate, but when it dissolves in the A-site in the ilmenite structure, the comparison needs to be based on its six-coordinate ionic radius, the six being the coordination number of the A-site in the ilmenite structure. The six-coordinate ionic radius of Ca is, as presented in Table 1, 1.00 Å. Accordingly, the ratio of the six-coordinate ionic radius of Ca to the six-coordinate ionic radius of copper, or the "ionic radius ratio," is 1.30. As a result, the "ionic radius ratio" fell outside the range of about 0.96 to about 1.04, resulting in a low coverage of 72%.

For sample 17, the "ionic radius ratio" fell outside the range of about 0.96 to about 1.04, resulting in the expulsion of $CaZrO_3$ from the inner electrode portion. Presumably as a result of this, the heat resistance of the inner electrodes was not improved, and the coverage was low.

Experimental Example 3

Base Material of the Ceramic Forming the Dielectric Layers: $SrTiO_3$

1. Preparation of a $SrTiO_3$ Ceramic Raw Material that Will Form the Dielectric Layers As starting materials, powders of $SrCO_3$ and $TiO_2$, which were base ingredients, and powders of MnO, $SiO_2$, and MgO, which were minor ingredients, were weighed out and mixed together for 72 hours in a ball mill. Then the resulting mixture was subjected to heat treatment for 2 hours, with the maximum temperature being 1000° C. In this manner, a $SrTiO_3$ ceramic raw material powder was obtained.

2. Preparation of a Conductive Paste for the Formation of Inner Electrodes

A powder of the "$ABO_3$ oxide" specified in Table 4, which will be provided later herein, and the $SrTiO_3$ ceramic raw material powder for dielectric layers described above were used as ceramic powders included in the conductive paste for the formation of inner electrodes.

The powder of an "$ABO_3$ oxide" and $SrTiO_3$ ceramic raw material powder were weighed out to the "percentages added" specified in Table 4, and a conductive paste for the formation of inner electrodes was prepared through the same steps as in the case of Experimental Example 1 above.

In Table 4, the "ionic radius ratio (A-site element/metallic copper)" is presented as in the case of Table 2. It should be noted that for sample 27, the ratio of the six-coordinate ionic radius of the Sr element (1.18 Å), indicated in Table 1, to the six-coordinate ionic radius of copper (0.77 Å) is presented.

3. Production of a Multilayer Ceramic Capacitor

A ceramic slurry including the $SrTiO_3$ ceramic raw material powder prepared in 1 above was prepared, and then ceramic green sheets were shaped by applying doctor blading to the ceramic slurry. After that, the same steps as in the case of Experimental Example 1 were followed to produce a sample multilayer ceramic capacitor.

4. Evaluation

TABLE 4

| Sample | $ABO_3$ oxide | Percentage added [% by volume] $ABO_3$ oxide | $SrTiO_3$ | Ionic radius ratio (A-site element/metallic copper) | Coverage [%] | Assessment |
|---|---|---|---|---|---|---|
| 21 | $CuTiO_3$ | 100 | 0 | 1.00 | 83 | ○ |
| 22 | $CoTiO_3$ | 100 | 0 | 0.96 | 83 | ○ |
| 23 | $CrTiO_3$ | 100 | 0 | 1.04 | 82 | ○ |
| 24 | $CuTiO_3$ | 10 | 90 | 1.00 | 82 | ○ |
| 25 | $CoTiO_3$ | 10 | 90 | 0.96 | 82 | ○ |
| 26 | $CrTiO_3$ | 10 | 90 | 1.04 | 80 | ○ |
| 27 | — | — | 100 | 1.53 | 70 | x |

The "coverage" was determined as presented in Table 4 following the same procedure as in the case of Experimental Example 1 and evaluated as in Experimental Example 1.

5. Discussion

Samples 21 to 26 in Table 4 received an "assessment" of "○." For these samples 21 to 26, the inner electrodes include any of $CuTiO_3$, $CoTiO_3$, or $CrTiO_3$ as an $ABO_3$ oxide. The inner electrodes, furthermore, include copper as a conductive material.

Ionic radii are focused on here. First, as indicated in the "$CuTiO_3$" section in Table 1, the six-coordinate ionic radius of copper is 0.77 Å. Meanwhile, the six-coordinate ionic radii of the A-site elements in $CuTiO_3$, $CoTiO_3$, and $CrTiO_3$ as the $ABO_3$ oxides included in the inner electrodes of samples 21 to 26 are 0.77 Å, 0.74 Å, and 0.80 Å, respectively, as presented in Table 1.

For samples 21 to 26, which were rated "○," the ratio of the six-coordinate ionic radius of the A-site element in $ABO_3$ to the six-coordinate ionic radius of copper, or the "ionic radius ratio," is about 0.96 or greater and about 1.04 or less.

Overall, for $CuTiO_3$, $CoTiO_3$, and $CrTiO_3$ as the $ABO_3$ oxides in samples 21 to 26, the six-coordinate ionic radius of the A-site element in $ABO_3$ is equal to or close to the six-coordinate ionic radius of copper as the conductive metal that is to be included in the inner electrodes. The energy difference between the oxide and copper in the inner electrodes, therefore, is 0 or small, allowing the oxide to remain in the inner electrode portion rather than being expelled. The oxide acts to improve the heat resistance of the inner electrodes. Presumably as a result of this, samples 21 to 26 achieved a high coverage of 80% or more.

As can be seen from samples 24 to 26, furthermore, the percentage of $CuTiO_3$, $CoTiO_3$, or $CrTiO_3$ added is not necessarily 100%. As long as the percentage was about 10% or more, the advantage of improved coverage was observed compared with when none of $CuTiO_3$, $CoTiO_3$, or $CrTiO_3$ was included.

In contrast to these, for sample 27, which was rated "x," only $SrTiO_3$ as a common material has been added to the inner electrodes. In this case, Sr that is the A-site element in $ABO_3$ in the perovskite structure is twelve-coordinate, but when it dissolves in the A-site in the ilmenite structure, the comparison needs to be based on its six-coordinate ionic radius, the six being the coordination number of the A-site in the ilmenite structure. The six-coordinate ionic radius of Sr is, as presented in Table 1, 1.18 Å. Accordingly, the ratio of the six-coordinate ionic radius of Sr to the six-coordinate ionic radius of copper, or the "ionic radius ratio," is 1.53. As a result, the "ionic radius ratio" fell outside the range of about 0.96 to about 1.04, resulting in a low coverage of 70%.

For sample 27, the "ionic radius ratio" fell outside the range of about 0.96 to about 1.04, resulting in the expulsion of $SrTiO_3$ from the inner electrode portion. Presumably as a result of this, the heat resistance of the inner electrodes was not improved, and the coverage was low.

In Experimental Examples 1 to 3 described above, the powder of at least one oxide of $ABO_3$ type with a specified ionic radius as at least a portion of the ceramic powder included in the conductive paste was a powder of at least one of $CuTiO_3$, $CoTiO_3$, or $CrTiO_3$. The powder, however, may be a powder of an oxide other than these. In other words, the oxide of $ABO_3$ type with a specified ionic radius can be any oxide of $ABO_3$ type as long as it is one in which the ratio of the six-coordinate ionic radius of the A-site element in $ABO_3$ to the six-coordinate ionic radius of copper, which is included in the conductive paste, is about 0.96 or greater and about 1.04 or less.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A conductive paste to be included in inner electrodes of a multilayer ceramic capacitor, the conductive paste comprising:
   a conductive metal powder;
   a ceramic powder;
   an organic solvent; and
   an organic binder; wherein
   the conductive metal powder includes copper;
   at least a portion of the ceramic powder is a powder of at least one oxide of an $ABO_3$ type with a specified ionic radius in which a ratio of a six-coordinate ionic radius of an A-site element in $ABO_3$ to a six-coordinate ionic radius of copper is about 0.96 or greater and about 1.04 or less;
   the oxide of the $ABO_3$ type with the specified ionic radius has an ilmenite crystal structure; and
   the at least one oxide of the $ABO_3$ type with the specified ionic radius is at least one of $CuTiO_3$, $CoTiO_3$, or $CrTiO_3$.

2. The conductive paste according to claim 1, wherein about 10% by volume or more of the ceramic powder is the powder of at the least one oxide of the $ABO_3$ type with the specified ionic radius, and a remainder of the ceramic powder is a powder including at least one of $BaTiO_3$, $SrTiO_3$, or $CaZrO_3$.

3. The conductive paste according to claim 1, wherein the ceramic powder includes at least one of Mn, Mg, Si, Y, Dy, or Gd as a minor additional material.

* * * * *